United States Patent [19]

Seidel et al.

[11] 3,914,223

[45] Oct. 21, 1975

[54] 1,2,4,-4H-TRIAZOLE DERIVATIVES

[75] Inventors: Michael C. Seidel, Levittown; William C. Von Meyer, Willow Grove; Stanley E. Greenfield, Ambler, all of Pa.

[73] Assignee: Rohm and Haas Company, Philadelphia, Pa.

[22] Filed: Dec. 26, 1973

[21] Appl. No.: 428,464

Related U.S. Application Data

[60] Division of Ser. No. 297,865, Oct. 16, 1972, Pat. No. 3,824,312, which is a continuation of Ser. No. 67,198, Aug. 26, 1970, abandoned.

[52] U.S. Cl. ............... 260/247.5 E; 260/256.4 N; 260/296 R; 71/92; 71/94; 71/88; 424/248

[51] Int. Cl.$^2$ ...................................... C07D 295/22

[58] Field of Search ... 260/296 R, 247.5 E, 256.4 N

*Primary Examiner*—Donald G. Daus
*Assistant Examiner*—Jose Tovar

[57] ABSTRACT

Substituted 1,2,4-4H-triazoles of the formula

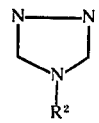

wherein $R^2$ is a heterocyclic radical. These compounds are fungicides and are particularly useful for the control of cereal rusts.

4 Claims, No Drawings

1,2,4,-4H-TRIAZOLE DERIVATIVES

This application is a division of copending U.S. Ser. No. 297,865, filed Oct. 16, 1972, now U.S. Pat. No. 3,824,312 issued July 16, 1974, which, in turn, is a continuation of U.S. Ser. No. 67,198 filed Aug. 26, 1970, now abandoned.

This invention is concerned with substituted 1,2,4-4H-triazoles, hereinafter termed 1,2,4-triazoles, which possess fungicidal properties useful for the control of fungal diseases on plants and in some instances herbicidal properties and to agricultural compositions containing them. It also relates to certain of these 1,2,4-triazole which possess fungicidal properties useful for the control of fungal diseases on plants and in some instances herbicidal properties and to agricultural compositions containing them. It also relates to certain of these 1,2,4-triazoles which are novel compounds and to their method of preparation. Further, it relates to certain 1,2,4-triazoles which are useful as systemic fungicides for the control of a rust disease, as on a cereal crop.

The chemistry of the 1,2,4-triazoles has been reviewed by K. T. Potts in Chemical Reviews 61, 87-127 (1961). A few such compounds are known to possess biological properties. 3-Amino-1,2,4-triazole is a commercial herbicide, and thiocarbamyl derivatives of it possess fungicidal properties useful for paints according to French Pat. No. 1,425,253. Japanese patent publication No. 11480/66 disclosed certain 3-mercapto-4-amino-5-(substituted-methyl)-1,2,4-4H-triazole as fungicides. 5-Amino-1-[bis(dimethylamino)-phosphenyl]-3-phenyl-1,2,4-triazole is a known fungicide. U.S. Pat. No. 3,308,131 discloses among others 3-mercapto-1-(substituted-carbamyl)-1,2,4-triazoles useful as insecticides.

Relatively few compounds are known to control fungal rust organisms and still fewer which control them by systemic action. Rust fungicides include symmetrical-dichlorotetra-fluoroacetone, ethylenebisdithiocarbamates, nickel compounds, phenyl-hydrazones, cycloheximide and certain carboxamido oxathiins.

The substituted 1,2,4-triazoles of this invention which have been found useful as fungicides for the control of phytopathogenic fungi are represented by the the general formula

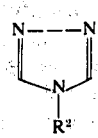 (1)

wherein $R^2$ is a heterocyclic group selected from the group consisting of 2-pyridyl, 4-pyridyl, 2-pyrimidyl, 4-morpholino, and their halo preferably chloro substituted derivatives, and their acid salts.

Various methods are available for the preparation of the compounds of Formula I.

The method of Bartlett and Humphrey, J. Chem. Soc. 1967, 1664–1666, involving a transamination of N,N-dimethylformamide azine may be used; thus

The reaction usually involves heating to remove the dimethylamine and may be run in the presence of a solvent such as an aromatic hydrocarbon. An acidic catalyst may be used.

The method of Pellizzari (Chemical Reviews 61, 95 (1961) involves diformhydrazide with primary amines; thus

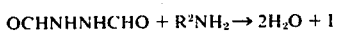

The method of U.S. Pat. No. 3,647,814 which involves reaction of a primary amine with an N-alkoxymethylene-N'-formylhydrazine.

Salts of various of the substituted 1,2,4-triazoles may be made by methods known to one skilled in the art. Thus, 1. the basic 1,2,4-triazoles may be reacted with mineral and organic acids, e.g. see Ainsworth et al. J. Med. Pharm. Chem. 5, 383 (1962).

Details of preparing typical compounds of this invention are given in the following examples which are presented for purposes of illustration and are not intended to limit the scope of the invention. Table I lists by structure and name, compounds prepared by the above-described processes and constitutes Examples 1 through 5. Table II gives physical characteristics and analyses or literature references for these examples.

EXAMPLE 3

Preparation of 4-(2-pyrimidyl)-1,2,4-triazole

A reaction mixture consisting of 10g (0.0705) of N,N-dimethylformamide azine and 6.7g (0.0705 mole) 2-aminopyrimidine in dimethylformamide was refluxed 72 hours under a blanket of nitrogen and then stripped of solvent. The resulting residue was recrystallized from ethanol to give 1.5g. of solid melting at 246°–249°C. An infrared spectrum showed the absence of the starting materials and an nmr spectrum showed the solid to be 4-(2-pyrimidyl)-1,2,4-triazole.

EXAMPLE 4

Preparation of 4-(4-morpholino)-1,2,4-triazole

A reaction mixture consisting of 10g. (0.0705 mole) of N,N-dimethylformamide azine, 7.2g (0.0705 mole) of N-aminomorpholine, 0.6g. of p-toluenesulfonic acid and 150 ml. of benzene was heated at reflux overnight then stripped of the solvent. The resulting residue was recrystallized first from benzene and then from ethanol to give 2.1g. of solid melting at 148°–150°C. From the mother liquors another 1.3g. of the same solid was isolated. The product was identified by its nmr spectra as 4-(4-morpholino)-1,2,4-triazole.

EXAMPLE 5

Preparation of 4-(5-chloro-2-pyridyl)-1,2,4-triazole

A reaction mixture consisting of 10g. (0.0705 mole) of N,N-dimethylformamide azine, 6g. (0.0705 mole) of 2-amino-5-chloropyridine, 0.5g. of p-toluenesulfonic acid and 200 ml. of dimethylformamide was heated at reflux for 4 days then stripped of the solvent. The residue was recrystallized from ethanol to give 3.7 g. of solid and then from 125 ml. of ethanol in the presence of charcoal to give 3.4g. of solid melting at 217°–218°C. An nmr spectra identified the product as 4-(5-chloro-2-pyridyl)-1,2,4-triazole.

Table I

1,2,4-Triazole Examples

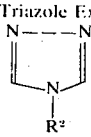

| Ex. No. | $R^2$ | Name |
|---|---|---|
| 1 | 4-pyridyl | 4-(4-pyridyl)-1,2,4-triazole |
| 2 | 2-pyridyl | 4-(2-pyridyl)-1,2,4-triazole |
| 3 | 2-pyrimidyl | 4-(2-pyrimidyl)-1,2,4-triazole |
| 4 | 4-morpholina | 4-(4-morpholina)-1,2,4-triazole |
| 5 | 5-chloro-2-pyridyl | 4-(5-chloro-2-pyridyl)-1,2,4-triazole |

Table II

Characterization of Examples

| Example No. | Melting Point (°C.) | Empirical Formula | Analysis * or Literature of Reference | | |
|---|---|---|---|---|---|
| | | | C | H | N |
| 1 | 230–231 | $C_7H_6N_4$ | 57.8 (57.5) | 4.0 (4.1) | 38.1 (38.4) |
| 2 | 162–163 | $C_7H_6N_4$ | J. Org. Chem. 18, 1368 | | |
| 3 | 246–249 | $C_6H_5N_5$ | 49.2 (49.0) | 3.3 (3.4) | 47.6 (47.6) |
| 4 | 148–150 | $C_6H_{10}N_4O$ | 44.8 (46.8) | 6.7 (6.5) | 35.4 (36.3) |
| 5 | 217–218 | $C_7H_5ClN_4$ | 47.0 (46.5) | 2.8 (2.8) | 30.8 (31.0) |

* The number in parenthesis represents the theoretical value as calculated from the empirical formula Among the structures of this invention which are fungicidal the preferred compounds are those which are novel. Novel structures within this invention may be represented by the structure

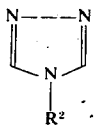

wherein
$R^2$ is heterocyclic group selected from the group
a. 4-pyridyl, 2-pyrimidyl, and 4-morpholino
b. the monochlorinated derivatives of the above groups and
c. chlorinated 2-pyridyl.

The 1,2,4-triazoles of this invention and salts thereof posses biocidal properties and in this respect are particularly useful as agricultural fungicides. As such, they may be applied to various loci such as the seed, the soil or the foliage. For such purposes the 1,2,4-triazoles may be used in the technical or pure form as prepared, as solutions or as formulations. The compounds are usually taken up in a carrier or are formulated so as to render them suitable for subsequent dissemination as pesticides. For example, the 1,2,4-triazoles may be formulated as wettable powders, emulsifiable concentrates, dusts, granular formulations, aerosols, flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers, adhesives and the like in accordance with agricultural practices. Such adjuvants commonly used in the art may be found in the John W. McCutcheon, Inc. publication "Detergents and Emulsifiers 1967 Annual." Of course the surfactant should be selected relative to the specific triazole. In some instances the cationic 1,2,4-triazole salts may be incompatible with anionic surfactants and the anionic 1,2,4-triazole salts may be incompatible with cationic surfactants.

In case the 1,2,4-triazole compound is water-soluble, it may be dissolved directly in water to provide an aqueous solution for application. Similarly, the compounds of this invention may be dissolved in a water-miscible liquid, such as methanol, ethanol, isopropanol, acetone, dimethylformamide or dimethyl sulfoxide or mixtures of these with water and such solutions extended with water. The concentration of the solution may vary from 2% to 98% with a preferred range being 25% to 75%.

For the preparation of emulsifiable concentrates, the compound may be dissolved in organic solvents, such as xylene, pine oil, orthodichlorobenzene, methyl oleate or a mixture of solvents, together with an emulsifying agent which permits dispersion of the pesticide in water. The concentration of the active ingredient in emulsion concentrates is usually 10% to 25% and in flowable emulsion concentrates, this may be as high as 75%.

Wettable powders suitable for spraying, may be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of 20% to 98%, preferably 40% to 75%.

Dusts are prepared by mixing the 1,2,4-triazoles with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredient are commonly maded and are subsequently diluted to 1% to 10% use concentration.

The 1,2,4-triazoles can be applied as fungicidal sprays by methods commonly employed, such as conventional high-gallonage hydraulic sprays, low gallonage sprays, airblast spray, aerial sprays and dusts. The dilution and rate of application will depend upon the type of equipment employed the method of application and diseases to be controlled, but the amount is usually 0.1 lb. to 25 lbs. per acre of the active ingredient.

As a seed treatment, the amount of toxicant coated on the seed is usually at a dosage rate of about 0.1 to 20 ounces per hundred pounds of seed. As a soil fungicide the chemical may be incorporated in the soil or applied to the surface usually at a rate of 0.1 to 25 lbs. per acre. As a foliar fungicide the toxicant is usually applied to growing plants at a rate of 0.25 to 10 pounds per acre.

The substituted 1,2,4-triazoles of this invention are also of interest when mixed with fertilizers and fertilizing materials. Such mixtures with fertilizers may be made in a variety of ways. For example, liquid formulations may be sprayed onto particles of mixed fertilizer or of fertilizer ingredients, such as ammonium sulfate, ammonium nitrate, ammonium phosphate, potassium chloride or sulfate, calcium phosphate or urea, singly or in admixture. Also, the toxicants and the solid fertilizing materials may be admixed in mixing or blending equipment. Similarly, a solution of toxicants in a volatile solvent may be applied to particles of fertilizer or fertilizer ingredients. A particularly useful form in which the toxicants are incorporated with fertilizers is in granular formulations. This type of solid composition serves a dual purpose in providing fertilizing material for the rapid growth of desired plants and at the same time helps control fungal diseases in one operation without the necessity of separate applications.

The compounds of this invention were evaluated as foliar fungicides for the control of wheat leaf rust, *Puccinia recondita*. In this test aqueous sprays were applied to about one week old wheat seedlings and the plants were allowed to dry. They were then inoculated with standard spore suspension of the wheat leaf rust organism containing approximately 25,000 spores per ml. The plants were then held under standard conditions for the disease to develop. After about 7–9 days, lesions were counted and compared to those on untreated plants. The percent disease control was calculated. In a related test in order to determine the persistency of the sprays, the treated plants were rained upon for varying times in a standard rain machine in which six minutes of rain was equal to about one inch of rain. Table III gives the results. Dashes indicate no data.

Table III

| | Wheat Leaf Rust Control by Foliar Application | | | |
|---|---|---|---|---|
| | % Control (without rain) | | % Control (with 1" of rain) | |
| Example No. | 1 lb. | 0.25 lb. | 1 lb. | 0.25 lb. |
| 1 | 10 | 10 | 0 | 0 |
| 2 | 100 | 100 | 99 | — |
| 3 | 87 | 94 | 97 | — |
| 4 | 94 | 88 | — | — |
| 5 | 95 | 90 | 85 | 45 |

The compounds of this invention have exhibited excellent systemic activity in the control of cereal rusts.

As one test for systemic activity the compounds were evaluated by a root-uptake method. In the root-uptake test one of the active compounds of this invention, contained in a suitable formulation, was incorporated into the soil by either spraying it into a rotating drum of soil, or by drenching the soil. The dosage of active ingredient in the soil ranged from about 50.0 to about 2.5 parts per million (ppm). Seeds of a susceptible wheat variety were planted in the treated soil and allowed to germinate and grow to a height of about 4 inches. The plants were then inoculated with a spore suspension of *Puccinia recondita*. The plants sprayed with spores of the rust fungus were then held at 70°F. in a moist chamber about 16 hours to permit infection. The lesions were allowed to develop about one week and were then counted in comparison to untreated plants and the percent disease control calculated. In such a test, example 5 gave 95% control at 20 ppm.

The compounds of this invention may be utilized as the sole biocidal agents, alone or in admixture, or they may be employed in conjunction with other fungicides or with insecticides, miticides, bird repellents and comparable pasticides.

Fungicides which may be combined with the 1,2,4-triazoles of this invention include dithiocarbamates and derivatives such as ferric dimethyldithiocarbamate (ferbam), zinc dimethyldithiocarbamate (ziram), manganese ethylenebisdithiocarbamate (maneb) and its coordination product with zinc ion, zinc ethylenebisdithiocarbamate (zineb), tetramethylthiuram disulfide (thiram) and 3,4-dimethyl-1,3,5-2H-tetrahydrothiadiazine-2-thione; nitrophenol derivatives such as dinitro-(1-methylheptyl)phenyl crotonate (dinocap), 2-sec-butyl-4,6-dinitrophenyl 3,3-dimethylacrylate (binapacryl) and 2-sec-butyl-4,6-dinitrophenyl isopropyl carbonate, heterocyclic structures such as N-trichloromethylthiotetrahydro-phthalimide (captan), N-trichloromethylthiophthalimide (folpet), 2-heptadecyl-2imidazoline (glyodin), 2,4-dichloro-6-(o-chloroanilino)-s-triazine, diethyl phthalimidophosphorothioate 5-amino-1-[bis(dimethylamino)phosphinyl]-3-phenyl-1,2,4-triazole, 5-ethoxy-3-trichloromethyl-1,2,4-thiadiazole, 2,3-dicyano-1,4-dithiaanthraquinone (dithianon), 2-thio-1,3-dithio-[4,5-b]quinoxaline (thioquinox), 1-(butylcarbamoyl)-2-benzimidazole carbamic acid methyl ester, 4-(2-chlorophenylhydrazono)-3-methyl-5-isoxazolone, pyridine-2-thiol-1-oxide, 8-hydroxyquinoline, 2,3-dihydro-5-carboxanilido-6-methyl-1,4-oxathiin-4,4-dioxide, and bis(p-chlorophenyl)-3-pyridinemethanol; and miscellaneous fungicides such as dodecylguanidine acetate (dodine), 3-[2-(3,5-dimethyl-2-oxycyclohexyl)-2-hydroxyethyl]-glutarimide (cycloheximide), phenylmercuric acetate, N-ethylmercuri- 1,2,3,6-tetrahydro-3,6-endomethano-3,4,5,6,7,7-hexachlorophthalimide, phenylmercuric monoethanolammonium lactate, 2,3-dichloro-1,4-naphthoquinone, 1,4-dichloro-2,4-dimethoxybenzene, p-dimethylaminobenzenediazo sodium sulfonate, 2-chloro-1-nitropropane, polychloronitrobenzediazo sodium sulfonate, 2-chloro-1-nitropropane, polychloronitrobenzenes such as pentachloronitrobenzene, methyl isothiocyanate, fungicidal antibiotics such as griseofulvin or kasugamycin, tetrafluoridichloroacetone, 1-phenylthiosemicarbazide, Bordeaux mixture, nickel-containing compounds and sulfur.

We claim:
1. A compound of the formula

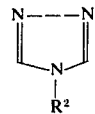

wherein R² is selected from the group consisting of (a) 4-pyridyl, 2-pyrimidyl and morpholino and their monochlorinated derivatives and (b) chlorinated 2-pyridyl, and their acid salts.

2. The compound according to claim 1 which is 4-(5-chloro-2-pyridyl)-1,2,4-triazole.

3. The compoundd according to claim 1 which is 4-morpholino-1,2,4-triazole.

4. The compound according to claim 1 which is 4-(2-pyrimidyl)-1,2,4-triazole.

* * * * *

UNITED STATES PATENT OFFICE
CERTIFICATE OF CORRECTION

PATENT NO. : 3,914,223
DATED : October 21, 1975
INVENTOR(S) : Michael C. Seidel, William C. Von Meyer and Stanley E. Greenfield It is certified that error appears in the above-identified patent and that said Letters Patent are hereby corrected as shown below:

The formula in the Abstract, in column 1 line 50, in column 3 in Table I and in column 3 line 35 and in claim 1 should all be:

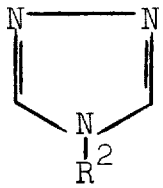

In column 3 Table I Example No. 4 the word morpholina should be morpholino in both occurrences.

Signed and Sealed this twenty-fourth Day of February 1976

[SEAL]

Attest:

RUTH C. MASON
Attesting Officer

C. MARSHALL DANN
Commissioner of Patents and Trademarks